(No Model.)

F. H. RICHARDS.
WEIGHING MACHINE.

No. 579,445.                          Patented Mar. 23, 1897.

Witnesses
Chas. F. Schmelz
Fred. J. Dole.

Inventor
F. H. Richards.

(No Model.) 6 Sheets—Sheet 5.

F. H. RICHARDS.
WEIGHING MACHINE.

No. 579,445. Patented Mar. 23, 1897.

Witnesses
Chas. F. Schmelz
Fred. J. Dole.

Inventor
F. H. Richards.

(No Model.) 6 Sheets—Sheet 6.
F. H. RICHARDS.
WEIGHING MACHINE.
No. 579,445. Patented Mar. 23, 1897.
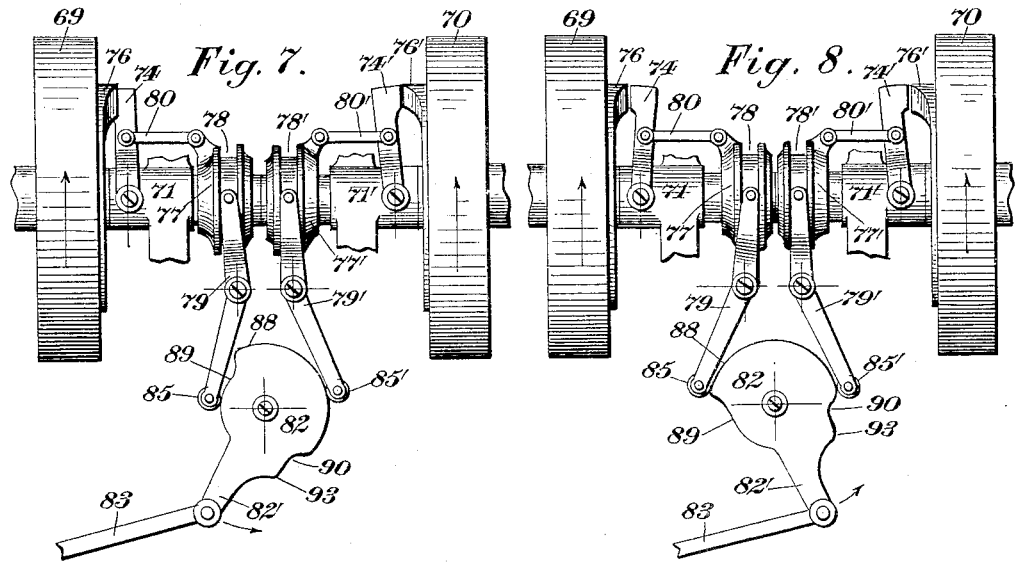
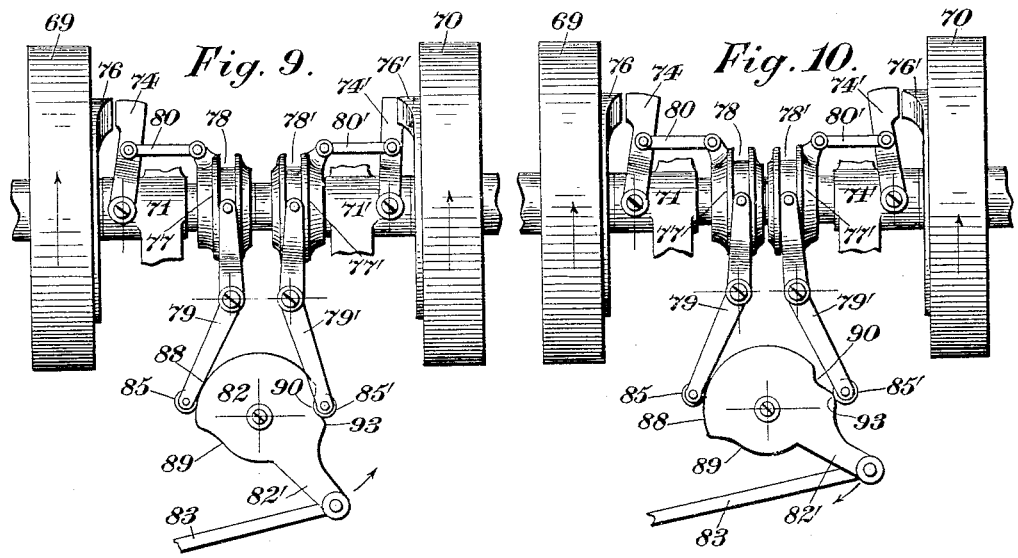
Witnesses
Chas. F. Schmelz
Fred. J. Dole.
Inventor
F. H. Richards

UNITED STATES PATENT OFFICE.

FRANCIS H. RICHARDS, OF HARTFORD, CONNECTICUT.

WEIGHING-MACHINE.

SPECIFICATION forming part of Letters Patent No. 579,445, dated March 23, 1897.

Application filed September 19, 1896. Serial No. 606,379. (No model.)

*To all whom it may concern:*

Be it known that I, FRANCIS H. RICHARDS, a citizen of the United States, residing at Hartford, in the county of Hartford and State of Connecticut, have invented certain new and useful Improvements in Weighing-Machines, of which the following is a specification.

This invention relates to weighing-machines for automatically weighing and delivering granular and pulverulent materials, but more especially those of a slow-running or sluggish character.

With respect to one of its features my present invention contemplates the employment of improved means for delivering a supply of material to the load-receiver or bucket of the weighing mechanism to form a load therein, such means including a feeder or positive-feed device having differential velocities.

In the modification of the invention herein illustrated the feeder will have successive or fast and slow speeds, so that on the first-mentioned movement the major part or bulk of the given load to be weighed will be supplied to the bucket by a stream of large volume, the residue or balance to make up the load being conveyed by the feeder in the form of a drip-stream on its slow speed, improved driving mechanism being employed for obtaining the necessary variation in speed at proper points in the operation of the machine and being also controlled from and by the weighing mechanism, whereby the machine is particularly adapted for weighing substances such as those previously indicated with facility and precision.

Another object of the invention is the provision of improved load-discharging means, which includes a closer for the discharge-outlet of the bucket, such closer consisting of a suitable frame and an endless carrier, said closer being connected to the bucket, driving mechanism being preferably employed for operating said carrier or conveyer, so that on the effective movement thereof the contents of the bucket may be removed with great rapidity.

Figure 1:
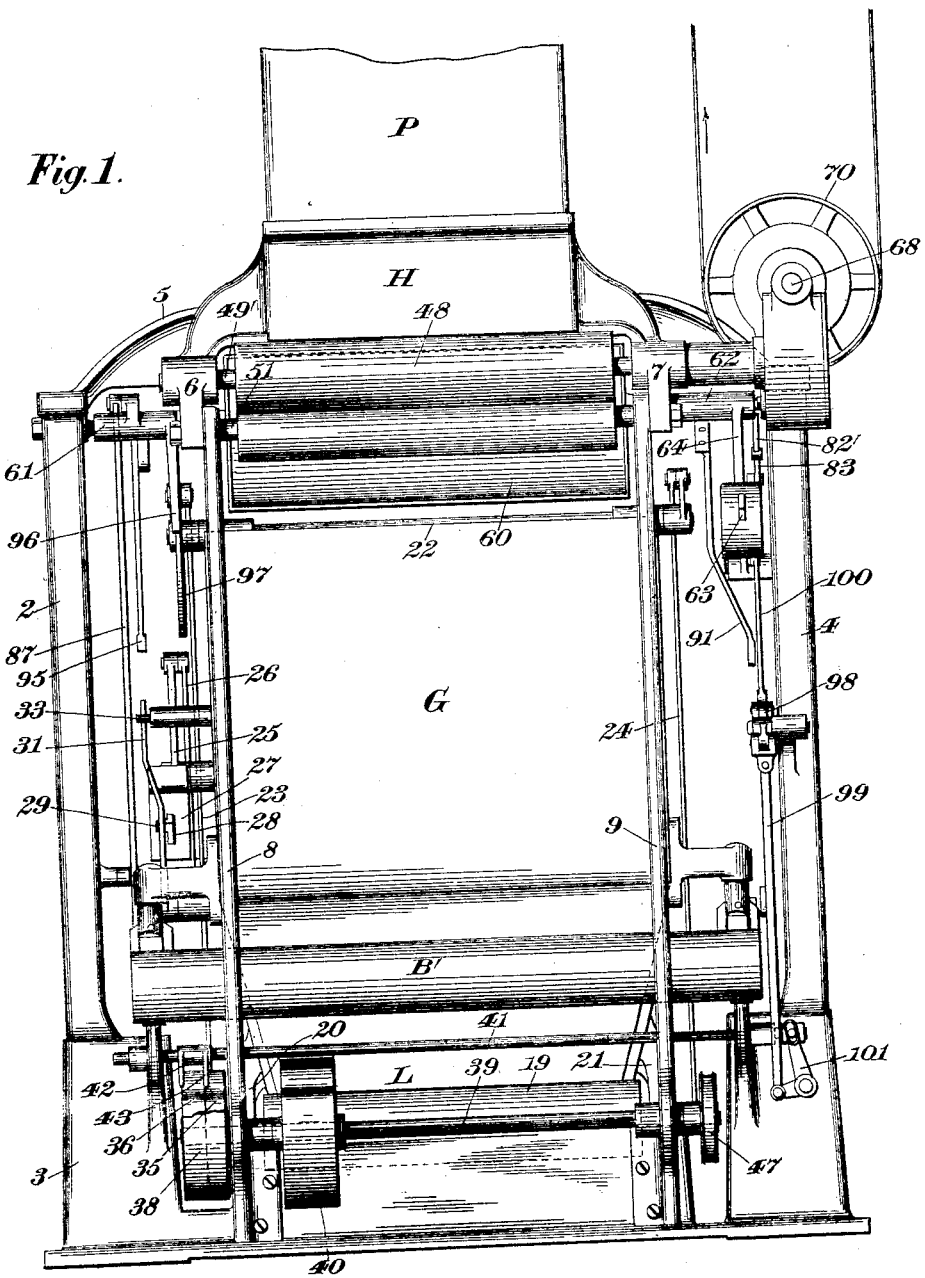
Figure 2:
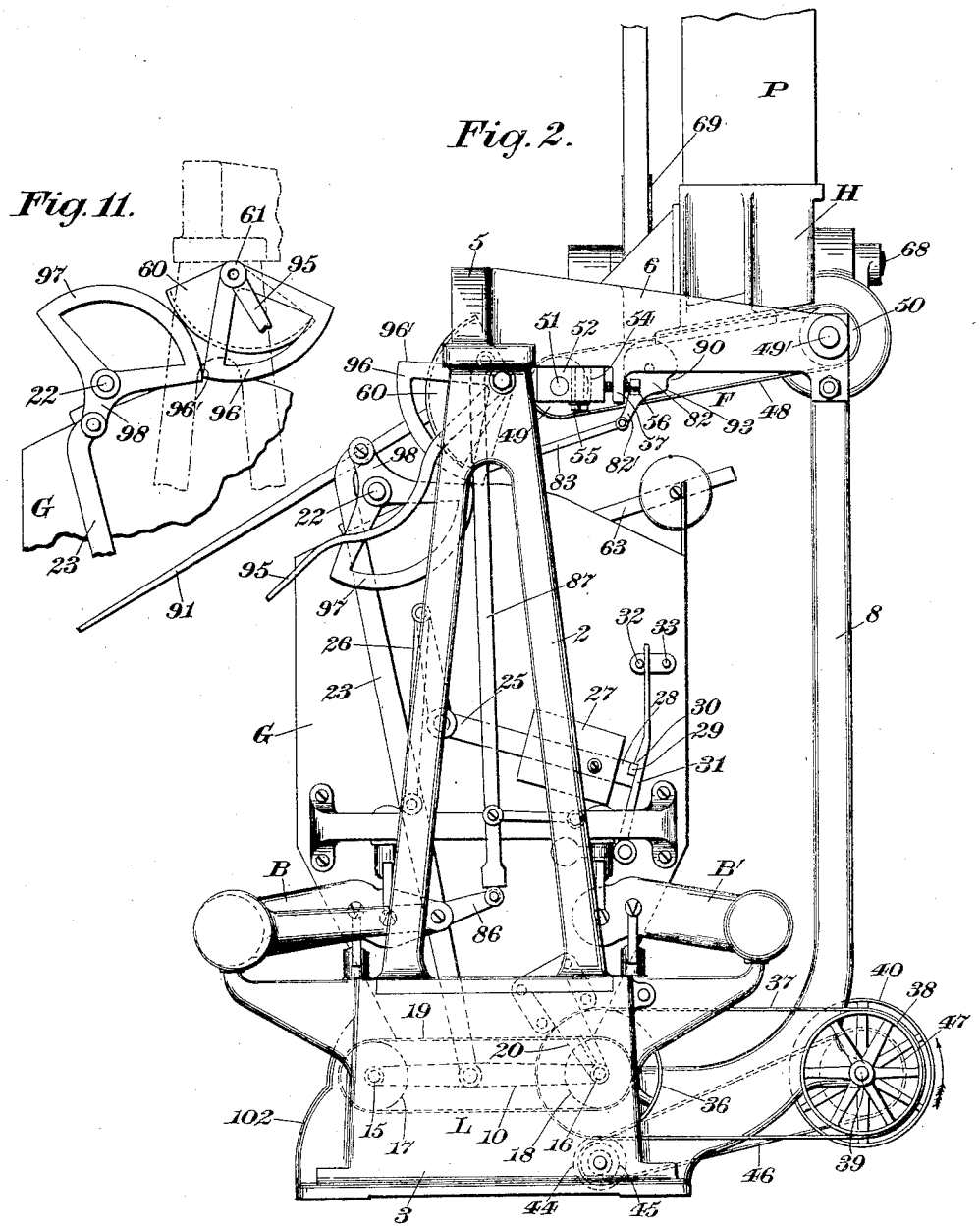
Figure 3:
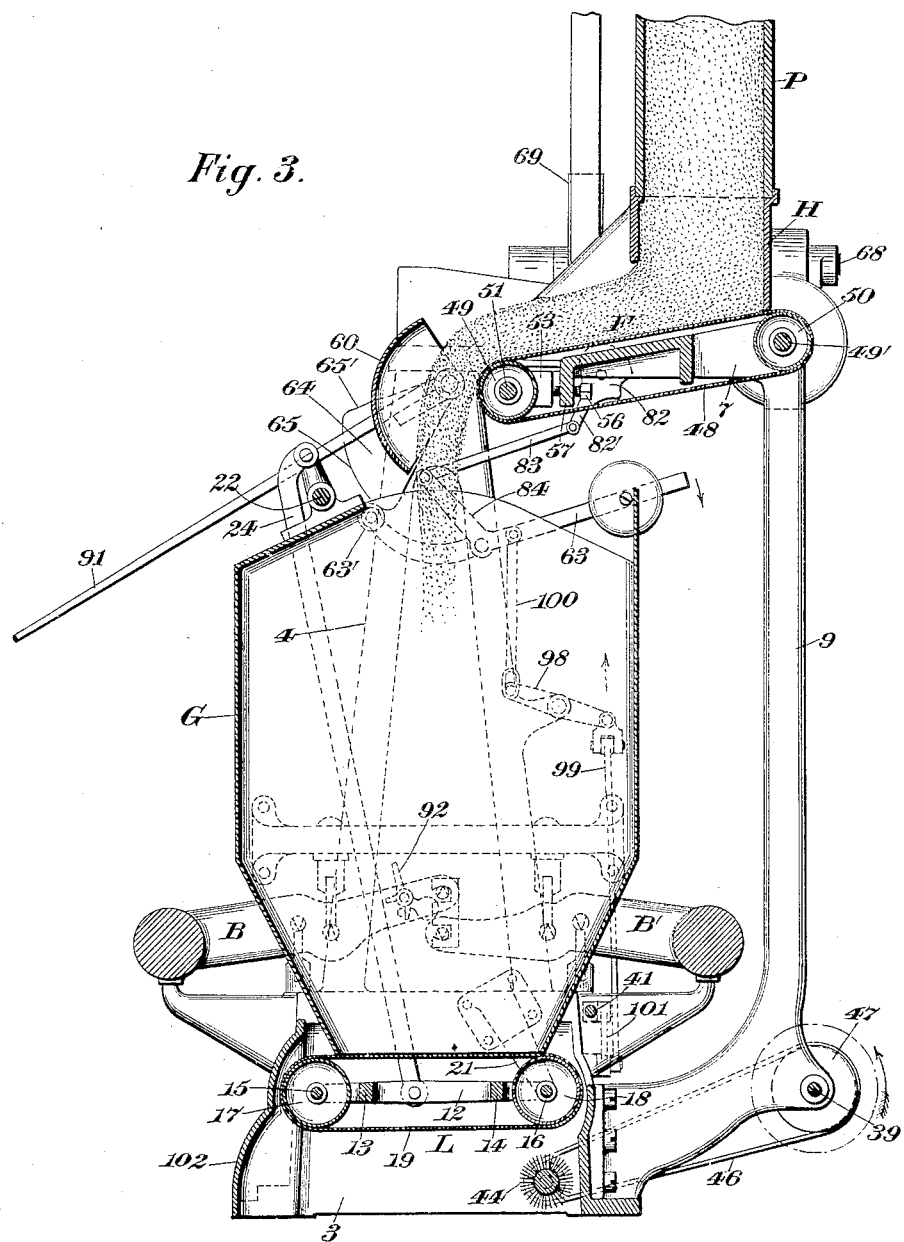
Figure 4:
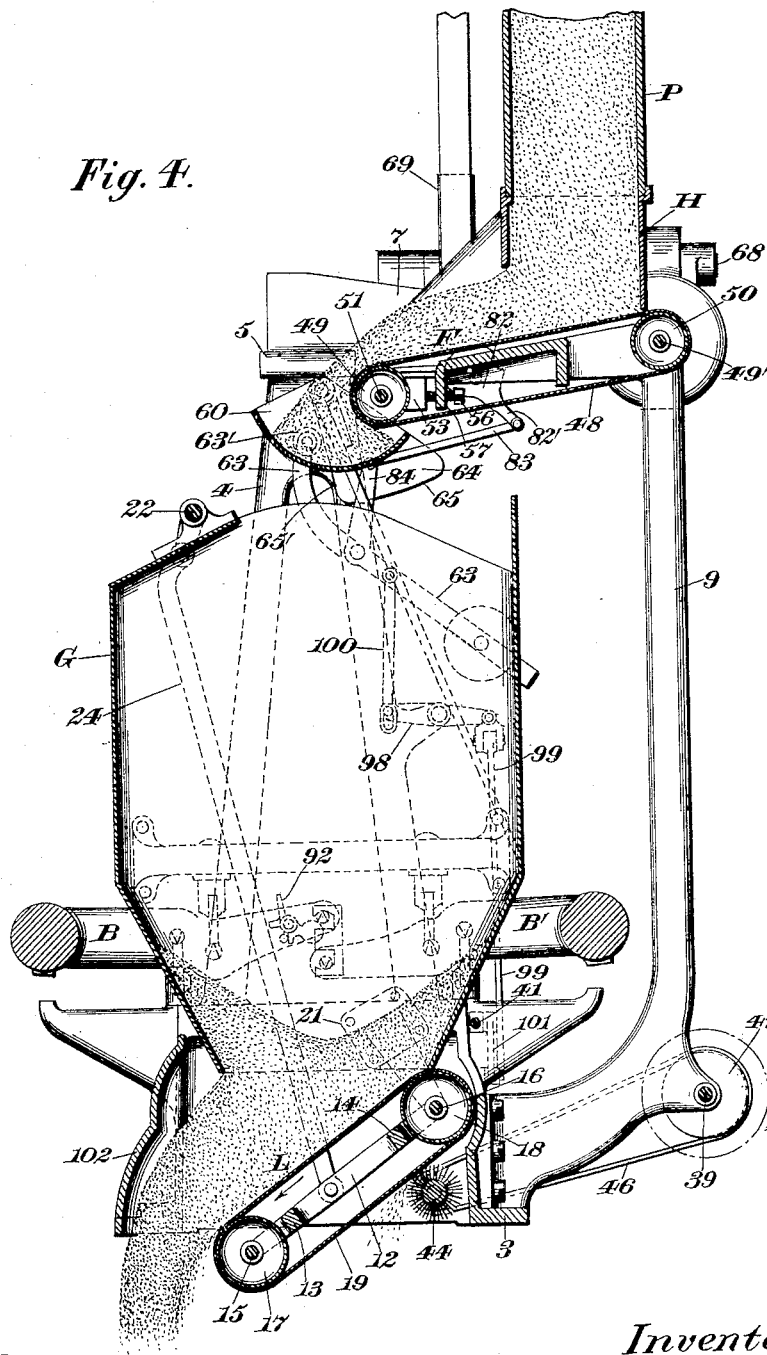
Figure 5:
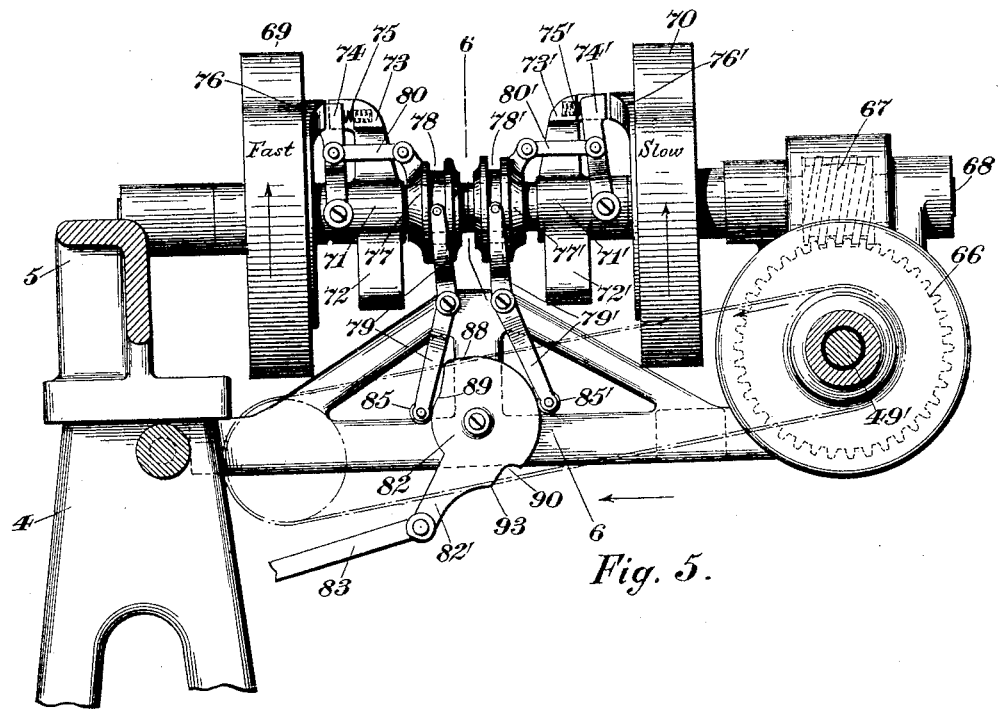
Figure 6:
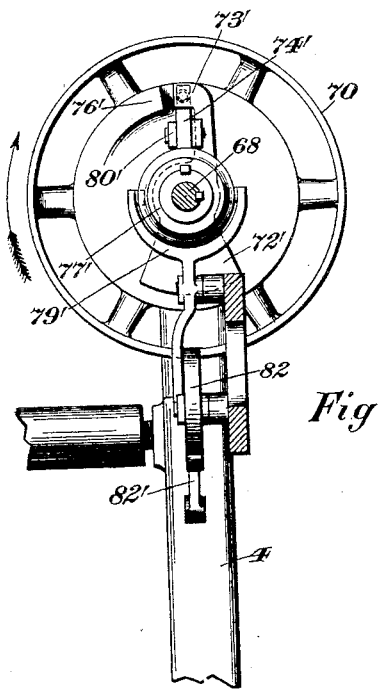

In the drawings accompanying and forming part of this specification, Figure 1 is a rear elevation of a weighing-machine embodying my present improvements. Fig. 2 is an end elevation of the machine as seen from the left in Fig. 1, the feeder being driven at its maximum or highest velocity and the closer being shut. Fig. 3 is a longitudinal central section of Fig. 2. Fig. 4 is a similar view, the feeder having been thrown out of action and being at rest and the closer being illustrated wide open and the load-discharge carrier or conveyer in motion. Fig. 5 is an enlarged detail view in elevation of the feeder driving and controlling mechanism. Fig. 6 is a transverse section taken in line 6 6, Fig. 5, and looking in the direction of the arrow. Figs. 7, 8, 9, and 10 are views substantially similar to Fig. 5 and illustrate the respective positions occupied by the feeder driving and controlling mechanism at successive stages during the weighing of a load; and Fig. 11 is a detail view in elevation of the valve and closer interlocking stop mechanism in one of its positions.

Similar characters designate like parts in all the figures of the drawings.

The framework for supporting the operative parts of the machine may be any suitable structure, and it is herein illustrated consisting of the supporting base or bed 3, which is approximately U-shaped, and the end frames or columns 2 and 4, which latter are connected at the top by the beam 5, suitably attached to said end frames.

A pair of rearwardly-extending plates are shown at 6 and 7, which may be cast in one piece with the beam 5, such plates being connected at their extreme outer ends to the posts or standards 8 and 9, which rise from and are attached to the base 3.

A supply chute or hopper is shown at H, it being joined to the plates 6 and 7, and it communicates with the supply-pipe P, which is set thereinto and rests on a shoulder formed within said chute, as indicated in Figs. 3 and 4.

The load-receiver or bucket is designated by G and has the usual receiving and discharge outlets, the latter being controlled by a closer, (designated in a general way by L and to be hereinafter more particularly described.)

For supporting the bucket I have illustrated beam mechanism of the duplex type, it consisting of the counterweighted scale-beams B and B', fulcrumed on the base or bed 3 and provided with bucket-supports, on which are adapted to rest suitable notched bearings depending from hangers on the end walls of the buckets in the manner disclosed in Letters Patent No. 548,840, granted to me October 29, 1895, to which reference may be had.

In the weighing of flour and other pulverulent materials which are of a viscous nature the mass is apt to wedge or bind in the bucket when the closer is released, and will not therefore freely descend. By having, however, a traveling closer normally shutting the discharge-outlet of the load-receiver and thrown into action on the fall of said closer the descent of the mass, due to gravitation, is aided and accelerated, and the coalescent particles are moved onward with rapidity, are separated from each other, and the bucket is readily discharged.

The closer, which is hinged to the bucket, consists of a suitable frame and an endless carrier, the upper run of which preferably fits tightly against the lower edge of the bucket, as indicated best in Fig. 3. Said frame consists of the longitudinal side pieces 10 and 12, joined by the transverse portions 13 and 14, the shafts 15 and 16 of the supporting drums or rolls 17 and 18 being journaled in the frame members 10 and 12. The carrier in the present instance consists of an endless belt or apron 19, of canvas, leather, or other suitable material, passed around the supporting pulleys or drums 17 and 18. The roll-shaft 16 is extended beyond the closer-frame and is preferably supported by the arms or brackets 20 and 21, which depend obliquely from the bucket, so that said closer may be freely opened and shut, as indicated in the sectional views, Figs. 3 and 4.

The endless carrier or belt 19 will be held ineffective or out of action during the weighing of a load, but immediately upon the opening of the closer it will be started, and on its effective movement, as indicated by the arrow in Fig. 4, will rapidly convey the contents of the bucket therefrom.

For maintaining the closer L shut or in its normal position during the weighing of a load the following instrumentalities may be employed: A transverse rock-shaft is shown at 22, having the rods 23 and 24 connected to suitable crank-arms thereon and also pivoted to the closer-frame.

An angle-lever is illustrated at 25 pivotally mounted on the bucket G and having one of its arms connected by the link 26 to the rod 23, the other arm of said angle-lever being furnished with a counterweight 27, preferably adjustable thereon, for returning the closer to its normal or shut position on the discharge of a load. The arm 28 of the angle-lever 25 is provided with a lug or shoulder 29, (see Fig. 2,) in position to be engaged by a coöperating shoulder 30 on the closer-latch 31 when the closer is shut. The closer-latch is in the form of a counterweighted angle-lever pivoted on the bucket G, and its range of movement will be limited by the stop-pins 32 and 33, which project from the bucket G.

It will be evident that when the upright arm of the latch 31 is moved to the right sufficiently far its shoulder 30 will be disengaged from the lug or shoulder 29 on the lever-arm 28, so that the closer L will be released and may be forced open by the weight of the load within the bucket.

The roll-shaft 16, near the outer end thereof, carries the fast and loose pulleys 35 and 36, connected by the belt 37 to the drive-pulley 38, said last-mentioned pulley being mounted on the shaft 39, which is journaled in suitable bearings on the posts 8 and 9, respectively, said belt 37 being shiftable from one of said pulleys 35 and 36 to the other, and vice versa, during the operation of the machine, whereby the carrier or belt 19 may be either stopped or started. The shaft 39 may be rotated in any convenient manner—for example, the pulley 40 thereon may be connected by belting to a similar pulley on a line-shaft. (Not shown.)

The action of the carrier or belt 19 will be governed or controlled by the weighing mechanism, as will now appear. A transversely-reciprocative belt-shipper bar is shown at 41, it being connected with a reciprocatory member of the weighing mechanism, as will hereinafter appear, said bar being furnished with the ordinary belt-engaging fingers, between which the driving-belt 37 is adapted to travel, and being also supported by suitable bearings on the base or bed 3.

On reference to Fig. 1, wherein the closer L is in its shut position, the driving-belt 37 (see Fig. 2) is on the loose pulley 36. At the close of the weighing operation the belt-shipping bar will be rapidly thrust to the right, and the driving-belt 37 being between the projecting fingers 42 and 43 thereof will be shipped or slipped from the loose pulley 36 to the fast pulley 35, so that on the initial opening movement of the closer L the carrier or belt 19 will be started.

In connection with the closer I prefer to employ a scraper therefor, the latter being contiguous to the lower run of the belt or carrier 19 when the closer is in its open position, as indicated in Fig. 4, such scraper being also rotary, so that on such movement it will scrape off or dislodge any particles which may have gathered on or stuck to said carrier or belt.

The scraper, which is designated by 44, consists of a cylindrical core or body of wood or similar material, to the opposite ends of which are attached gudgeons or trunnions, the latter being journaled in the end walls of the base 3. One of said gudgeons or trunnions carries a grooved pulley or wheel 45, connected by a belt or rope 46 to a similar pulley or wheel 47, which is carried by the constantly-rotating drive-shaft 39. The core or body of the scraper 44 will have projecting therefrom a multiplicity of bristles, forming collectively a brush-like structure, which are adapted to come in contact with the lower run of the carrier or belt 19 on the opening of the closer L, whereby said scraper may effect the hereinbefore-described results.

For supplying the bucket with material to form a load therein I employ a differential-speed feeder, which is designated by F, and the improved driving mechanism for effecting the variation in speed of said feeder at predetermined points in the operation of the machine will be hereinafter described.

The feeder F consists of an endless belt or apron 48, of suitable material, passed around the rolls or drums 49 and 50, the shaft 49' of the latter of said rolls being supported by the framing of the machine, the other roll being preferably adjustable, whereby the tension of the feeder-belt 48 may be properly regulated.

The opposite ends of the roll-shaft 51 are carried by the bearing-blocks 52 and 53, which latter being similar in construction and mounting a specific description of one will suffice for both. The block 52 is shown pierced by the longitudinal slot 54, through which passes the bolt 55, the thread of which enters a suitable threaded socket or seat formed on the under side of the plate 6, said bolt acting as a convenient guide for the block 53.

An adjusting-screw is shown at 56 passing through the flange 57 and bearing against the block 52, so that by rotating said adjusting-screw 56 the tension of the belt will be increased and its slack taken up.

The feeder F is located below the chute or hopper H and extends a slight distance rearward and laterally beyond the same, its effective movement being indicated by the arrow in Fig. 3, so that when in motion it is operable for conveying a mass or stream of material from said chute and for also delivering the same into the bucket G, wherein the load is built up.

The feeder, as hereinbefore stated, will have two speeds, it having its high or maximum speed at the commencement of operation for delivering the main stream into the bucket to form the major part of a load to be weighed, the balance being supplied by the drip-stream, which is conveyed by the feeder on its slow movement. On the completion of the load the feeder will be thrown out of action or stopped, simultaneously with which the closer L will be opened, and the carrier-belt 19 will be started to thereby discharge or convey away said load.

On the stoppage of the feeder F the mass near the discharge edge thereof usually descends, and as such dislodged mass forms no part of the weighed load it should be prevented from entering the bucket G. For catching such dislodged material I have illustrated a valve 60 of the "oscillatory-pan" type, said valve being furnished with laterally-extending arms 61 and 62, which have bearings in the outer ends thereof for receiving suitable journals carried by the framing of the machine, said valve being movable about an axis adjacent to the discharge end of the feeder F.

During the main-supply period the valve will be slowly moved toward the line of feed of the supply-stream, but does not come in contact therewith, it being at the commencement of the poising period quite close thereto, at which point it is intercepted to permit the unobstructed descent of the drip-stream into the bucket. On the release of the valve it will receive its final closing movement, which is a rapid one, and on such action will catch the dropping material from the feeder F.

For opening the valve I may employ the mechanism illustrated, which is substantially similar to that disclosed in the Letters Patent hereinbefore referred to.

For effecting the closure of the valve I have illustrated a counterweighted valve-closing actuator or lever 63 pivotally supported by the end frame 4, the non-counterweighted arm of said lever being provided with an antifriction-roll 63', which is adapted to successively engage and ride along the connected faces 65 and 65' of the cam 64, which depends from and is oscillatory with the valve, said last-mentioned cam-face being of such shape as to permit the exertion of a relatively great amount of leverage on the valve for effecting its rapid final closing movement.

At the commencement of operation, the valve being wide open, the roll 63' will be in the position illustrated in Fig. 3, so that as the weighted arm of the valve-closing lever drops the oscillation of the cam 64 and the consequent closure of the valve 60 will be obtained. At the commencement of the poising period the roll 63' will be at about the intersection of the two cam-faces, at which time it will be remembered the valve is momentarily held. On the release of said valve the weighted arm of the lever 63, which had also been held, will drop, and the roll 63' will be caused to ride along the cam-face 65', the valve thereby being quickly shut.

The driving mechanism for the feeder includes a shaft and a pair of loose power-transmitting members, which in the present instance are pulleys, means controlled by the weighing mechanism being employed for successively coupling said power-transmitting members to their supporting-shafts.

The roll-shaft 49' carries the gear 66, (see dotted lines, Fig. 5,) with which the worm 67 on the suitably-mounted power-shaft 68 is adapted to mesh, so that on the rotation of said shaft the worm 67, and hence the gear 66, will be also rotated, and the feeder F will be driven for conveying material from the chute or hopper H and delivering it to the bucket G.

The power-shaft 68 carries a pair of pulleys 69 and 70, which are loose thereon, the first-mentioned pulley being operatively connected to a large pulley and the pulley 70 being connected to a small pulley by belting, (said differential pulleys and belting not being shown.) The pulleys 69 and 70 are adapted to be coupled successively to the shaft 68 at predetermined points in the operation of the machine, and it will be evident that when the first-mentioned pulley is coupled to said shaft, it being connected with a pulley of large diameter, the feeder F will driven at a high speed. When such pulley 69 is uncoupled from its supporting-shaft 68 and the pulley 70 is coupled to said shaft, the latter being connected with a small pulley, the feeder F will be operated at a relatively low or reduced speed for conducting the dripstream into the bucket to complete the partial load already supplied thereto.

For successively coupling the two pulleys 69 and 70 to the supporting-shaft 68 I have illustrated means operatively connected with the valve-actuating lever 63, and which will now be described.

As the means for coupling the pulleys 69 and 70 to the supporting-shaft 68 is the same in each case a description of one will answer for both, corresponding parts in the other mechanism being designated by the same reference-character with a prime-mark. The shaft 68 carries the collar or sleeve 71, which is keyed thereto and which has the balance-weight 72 and the projection 73, said collar pivotally carrying the spring-pressed dog 74, against the free end of which a protractile spring 75, seated in a socket formed near the outer end of the projection 73, is adapted to bear, said spring normally tending to thrust the dog 74 outward and into the plane of movement of the projection 76 on the pulley 69, such action of the spring-pressed dog, however, being properly regulated. A second sleeve is shown at 77 keyed to the first-mentioned sleeve 71, but free to reciprocate longitudinally relatively thereto and slidable thereon, as will be understood, said sleeve 77 being peripherally grooved at 78 and also reciprocated by means operative with the weighing mechanism.

A bifurcated lever is illustrated at 79, it being pivotally mounted on the framing of the machine and adapted to engage the slidable coupling member 77, as indicated in Figs. 5 to 10, inclusive, the two branches of said lever being furnished with projecting pins located between the walls of the peripheral groove 78 in the slidable coupling member 77, so that as said coupling member is moved in either direction along its support it is adapted, through the medium of the interposed link 80, to cause the dog 74 to be thrust into or out of the plane of revolution of the projection 76 on the inner face of the pulley 69.

A cam is illustrated at 82 pivoted to the framing of the machine and having a projecting tailpiece 82' connected by the link 83 to the rock-arm 84 of the valve-actuating lever. (See Figs. 3 and 4.) The periphery or working face of the cam 82 is of peculiar curvature and is adapted to engage the rolls 85 and 85' on the lower ends of the two levers 79 and 79', as indicated in Figs. 5 and 10.

On reference to Fig. 7 the dog is shown in contact with the projection 76 on the inner face of the pulley 69, said pulley thereby being coupled to its supporting-shaft 68, so that on its rotation in the direction of the arrow the feeder F, through the gears 67 and 66, will be driven at a relatively high rate of speed for delivering the main supply to the bucket, the valve 60 at this time being wide open, as shown in Fig. 3. When a certain proportion of the load has been received by the bucket, it and the beam mechanism will descend and the counterweighted lever 86, which is pivotally mounted on the scale-beam B and which normally forms a part thereof, moving in synchronism with the beam B and falling from under the rod 87, which is eccentrically secured to the valve 60, will permit the closure of said valve by the counterweighted lever 63, the roll 63' of which is caused to ride along the cam-face 65 by the dropping of the weighted arm of said lever.

As the weighted arm of the valve-closing lever 63 drops, in the manner just alluded to, the tailpiece 82' of the cam 82, by reason of its operative connection with said lever, will be swung to the right, the upper part of said cam or the cam proper being oscillated to the left until the convexity or longitudinal face 88 of said cam engages the roll 85 on the lever 79, at which time said lever will be rocked and the coupling member 78 will be slid along its support until the dog 74 is disengaged from the projection 76 on the pulley 69, as illustrated in Fig. 8, whereby said pulley will be uncoupled from its supporting-shaft 68, the roll 85, up to the time it is met by the longitudinal cam-face 88, being in engagement with the compound curved face 89 of the cam 82, which face, however, does not impart any movement to the lever 79.

At the commencement of operation and up to the poising period, and while the cam 82 is being oscillated in the manner just described, the roll 85' and the lever 79' will be in contact with the longitudinal cam-face 88, whereby through the intermediate connections with said lever the dog 74' is held away from the plane of revolution of the projection 76' on the pulley 70, as illustrated in Figs. 7 and 8.

It will be assumed that the major part of the load has been delivered to the bucket, both dogs 74 and 74' at this time being disengaged from their coöperating projections on the two pulleys 69 and 70, as indicated in Fig. 8, this relation, however, continuing for a very brief space of time. On the continued oscillation of the cam to the left the roll 85' of the lever 79' will be thrust into the peripheral recess 90 on the cam 82 (illustrated in Fig. 9) and through the power of the protractile spring 75', which thrusts the dog 74' into the plane of the revolution of the projection 76', whereby the pulley 70 will be coupled to its supporting-shaft, as indicated in Fig. 9, the valve 60, and consequently the lever 63, being held against farther movement for a limited duration of time, whereby the dog 74' may be maintained in engagement with the projection 76', the feeder F at this time, through the pulley 70 and the meshing gears 67 and 66, being driven at a slow speed for delivering the drip-stream into the bucket.

For intercepting the valve 60 at the commencement of the poising period the following instrumentalities may be conveniently employed: A depending rod is illustrated at 91 rigidly and concentrically secured to the valve 60, and consequently oscillatory therewith. At the commencement of the poising period the rod 91 will be engaged by the by-pass 92 on an arm of the scale-beam B, so that the valve and also the actuating-lever 63 will be held, whereby the dog 74' will be kept in contact with the projection 76', as indicated in Fig. 9. When the load is nearly completed by the drip-stream, the bucket and beam mechanism will descend below the poising-line, so that the by-pass 92, which moves therewith, will release the valve-rod 91, whereby the valve may be given its final and accelerated movement by the dropping of the weighted arm of the counterweighted lever 63, as will be understood, the roll 63' of said lever being caused to ride along the cam-face 65'.

As the weighted arm of the valve-actuating lever 63 drops the cam 82 will be further oscillated to the left, or to the position illustrated in Fig. 10, until the bulge or boss 93 on the periphery of said cam meets the roll 85', whereby the dog 74' will be disengaged from the projection 76 and the pulley 70 instantly uncoupled from its shaft, it being understood that at this time the roll 85 is still in engagement with the longitudinal cam-face 88, whereby the dog 74 will be held away from the plane of revolution of the projection 76.

For tripping the closer-latch 31, which is normally in engagement with the angle-lever 28, I have illustrated a latch-tripper, operative with the valve and in the form of a depending rod 95, which is connected to the valve-supporting arm 61, the free end of the latch being disposed in the path of movement of said latch-tripper or arm 95.

At the commencement of the poising period the tripper or arm 95 will be quite close to the free end of the upright arm of the latch 31, so that on the release of the valve and its final closure in the manner previously described a sudden blow will be imparted to said latch, and on the continuation of such movement the shoulder 30 thereof will be disengaged from the corresponding shoulder 29 on the lever 28, whereby the closer L will be released and may be forced open by the weight of the contents of the bucket.

Reciprocally-effective stops are herein illustrated, both being of skeleton segmental shape and operative, respectively, with the valve and with the closer, the object thereof being to hold the closer L against opening movement while the valve is open, and vice versa.

The valve-operative stop is designated by 96, its coacting stop being designated by 97 and forming an integral extension of the crank-arm 98, which is pivoted to the closer-rod 23, whereby the movement of the stop member 97 will be controlled from the closer.

The action of the two interlocking stops will be evident from an inspection of Figs. 2 and 11 of the drawings.

In Fig. 2 the valve is shown open, the stop member 97 being contiguous to the curved face of the stop 96, so that should the latch 31 be prematurely tripped the oscillation of the stop member 97, and hence the opening of the closer L, will be positively blocked by the stop 96 and until the valve has nearly reached the end of its movement, at which time the stop-segment 96 will have intersected the plane of the curved face of the co-operating stop-segment 97, so that when the latch 31 is tripped the closer is free to open, and in so doing the curved face of the stop-segment 97 on its oscillation will be caused to travel along the straight face 96' of the stop-segment 96, whereby retractive movement of the valve will be prevented and the feeder F will be held out of action or at rest.

It will be remembered that the carrier or belt 19 is stationary or idle during the load-supply period, but on the completion of the load it is thrown into action by the shipping of the belt 37 from the loose pulley 36 to the fast pulley 35, and for thus shipping the belt means controlled by the valve-actuating lever 63 may be employed and will now be described.

A rocking lever is shown at 98, pivotally supported by a bracket on the end frame 4, one of its ends being connected by a universal joint to the thrust-rod 99, the opposite end of said lever being united by a slide-joint to the link 100, which is pivoted to the valve-actuating lever 63. The thrust-rod is connected at its lower end to the angle-lever 101, mounted on the base of the machine, said lever being loosely jointed to the transversely-reciprocative shipping-bar 41.

By reason of the loose connection of the link 100 to the rocking lever 98 the lever 63 may have a considerable amount of lost motion without affecting the position of said lever 98. At the close of the poising period and on the completion of the bucket-load, when the lever 63 is released, as described, its weighted arm will suddenly and quickly drop, and in so doing an upward thrust will be imparted to the connecting-rod 99 through the agency of the intermediate lever 98 and link 100, whereby the bar 41 will be drawn to the right, and the belt 37, which travels between the belt-shipping fingers 42 and 43, will be slipped from the loose pulley 36 to the fast pulley 35 to thereby start the carrier or belt 19 for conveying away the contents of the bucket.

A guard-plate is shown at 102 extending across and connected to the opposite members of the base 3, its object being to prevent spattering when the closer L is open and the carrier or belt 19 is in motion.

The operation of the hereinbefore-described weighing-machine, briefly, is as follows: Figs. 2 and 4 represent the positions occupied by the respective parts at the commencement of operation, the closer L being shut and locked in such position by the latch 31, which is in engagement with the lever 28. At this time the valve 60 will be in its wide-open position and the pulley 69 also coupled to its supporting-shaft 68, so that said pulley being rotated the feeder F will be driven at a comparatively rapid rate of speed by the interposed gearing and connections, said feeder being operable on such movement for conveying a body or stream of material of large volume from the chute or hopper H and for also delivering it to the empty bucket. When a certain proportion of the load has been received by the bucket, it and the beam mechanism will descend, the counterweighted lever 86 moving in synchronism therewith, and said lever falling away from the rod 87 will permit the closure of the valve 60 by the dropping of the counterweighted arm of the lever 63, the roll 63' of said lever being caused to ride along the cam-face 65. At the commencement of the poising period the depending rod 91 will have been engaged by the by-pass 92 on the scale-beam B, the pulley 69, in the interim, having been uncoupled from its shaft 68 and the pulley 70 coupled thereto, so that the feeder F may be driven at its slow speed for delivering the drip-stream to the bucket G to complete the load. On the completion of the load by the drip-stream the bucket and the beam mechanism will pass below the poising-line, and in so doing the by-pass stop 92, which moves with the beam B, will release the rod 91, so that the valve 60 may be given its final closing movement by the counterweighted lever 63, the weighted arm of which drops, and the roll 63' is caused to ride along the cam-face 65', as illustrated in Fig. 4, and during this action the pulley 70 will be uncoupled from its supporting-shaft, whereby the feeder F may be stopped. At a point near the end of the cut-off movement of the valve 60 the free end of the upright arm of the latch 31 will be engaged by the latch-tripper 95, so that on the continuation of the valve movement said latch-arm will be thrust outward and its shoulder 30 disengaged from the coöperating shoulder on the lever 28, whereby the closer L will be released, at which time it may be forced open by the weight of the bucket contents and the carrier or belt started by the shipping of the belt 37 from the loose pulley 36 to the fast pulley 35, by reason of the connection of the belt-shipping bar 41 with the counterweighted lever 63, in the manner hereinbefore described.

No claim is herein made to the combination, broadly, with weighing mechanism, of a force-feed material-conveyer movable therewith, as such subject-matter is set forth in my application filed October 17, 1896, Serial No. 609,199.

Having described my invention, I claim—

1. The combination with weighing mechanism embodying a bucket, of a feeder and its driving mechanism including a shaft carrying a pair of loose power-transmitting members; and means controlled by the weighing mechanism, for successively coupling said members to the shaft.

2. The combination with weighing mechanism embodying a bucket, of a feeder and its driving mechanism including a shaft carrying a pair of loose pulleys; and means controlled by the weighing mechanism, for successively coupling said pulleys to the shaft.

3. The combination with a bucket and with beam mechanism, of a feeder and its driving mechanism including a shaft carrying a pair of loose power-transmitting members; a valve and its actuating-lever; and means controlled by said lever, for successively coupling said power-transmitting members to the shaft.

4. The combination with weighing mechanism embodying a bucket; of a feeder and its driving mechanism including a shaft provided with a pair of loose pulleys, each having a projection; slidable members carried by said shaft; a pair of dogs adapted to successively engage the projections on said pulleys and operatively connected, respectively, with said slidable members; and a cam operative with the weighing mechanism, for alternately reciprocating said slidable members.

5. The combination with weighing mechanism embodying a bucket, of a feeder and its driving mechanism including a shaft provided with a loose pulley having a projection; a slidable member carried by said shaft; a spring-pressed dog adapted to engage the projection on said pulley and operatively connected to said slidable member; and means operative with the weighing mechanism, for reciprocating said slidable member.

6. The combination with weighing mechanism embodying a bucket, of a feeder and its driving mechanism including a shaft provided with a loose pulley having a projection; a sleeve keyed to said shaft and furnished with a projection having a socket; a sleeve slidable along the first-mentioned sleeve; a dog operatively connected to said slidable sleeve and adapted to engage the projection on said pulley; a spring seated in said socket and bearing against the dog; and means operative with the weighing mechanism, for reciprocating said slidable sleeve on its support.

7. The combination with weighing mechanism embodying a bucket, of a feeder and its driving mechanism including a shaft provided with a loose pulley having a projection; a slidable member carried by said shaft; a dog adapted to engage the projection on said pulley and operatively connected with said slidable member; a lever for reciprocating the latter on its support; and means operative with the weighing mechanism, for operating said lever.

8. The combination with weighing mechanism embodying a bucket, of a feeder and its driving mechanism including a shaft provided with a loose pulley having a projection; a slidable member carried by said shaft; a dog adapted to engage the projection on said pulley and operatively connected to said slidable member; a lever for reciprocating the latter on its support; and an actuating-cam for said lever controlled by the weighing mechanism.

9. The combination with weighing mechanism embodying a bucket, of a feeder and its driving mechanism including a shaft carrying a loose pulley having a projection; a member supported by said shaft for sliding movement, said sliding member having a dog connected by a link thereto, said dog being adapted to engage the projection on the pulley; a lever for reciprocating said sliding member along its support; and means controlled by the weighing mechanism, for operating said lever.

10. The combination with weighing mechanism embodying a bucket, of a feeder and its driving mechanism including a shaft provided with a loose pulley having a projection; a sleeve keyed to said shaft; a second and peripherally-grooved sleeve slidable on the first-mentioned sleeve, said slidable sleeve having a dog operatively connected thereto which is adapted to engage the projection on the pulley; a bifurcated lever, the branches of which are provided with pins located between the walls of the peripheral groove in said slidable sleeve; and means operative with the weighing mechanism, for reciprocating said sleeve on its support.

11. The combination with weighing mechanism embodying a bucket, of a feeder and its driving mechanism including a shaft provided with a loose pulley having a projection; a sleeve on said shaft, carrying a second sleeve peripherally grooved and slidable therealong, said first-mentioned sleeve having also a dog pivotally mounted thereon; a balance-weight and a projection extending from the first-mentioned sleeve, said projection having a socket adapted to receive a spring which bears against the dog; a link connecting said dog and peripherally-grooved sleeve; a bifurcated lever actuated by a cam controlled by the weighing mechanism, the branches of said lever having pins located between the walls of the grooves of said sliding sleeve.

12. The combination with weighing mechanism embodying a bucket, of a feeder and its driving mechanism including a shaft having a pair of loose pulleys, each of which has a projection; a pair of dogs adapted to engage, successively, said projections; levers operatively connected to said dogs; and a cam for actuating said levers, said cam being controlled by the weighing mechanism.

13. The combination with weighing mechanism embodying a bucket, of a feeder and its driving mechanism including a shaft carrying a pair of loose pulleys; a valve; an actuating-lever for said valve; and means controlled by the valve-actuating lever, for successively coupling said pulleys to the shaft.

14. The combination with a reciprocatory weighing-bucket having a discharge-outlet; of a closer for said outlet, connected to the bucket and consisting of a frame and an endless carrier.

15. The combination with a reciprocatory weighing-bucket having a discharge-outlet; of a closer for said outlet, hinged to the bucket and consisting of a frame and an endless carrier.

16. The combination, with a reciprocatory bucket, of a closer consisting of an endless carrier movably connected to said bucket to cover and uncover the discharge-outlet thereof; and mechanism for operating said carrier.

17. The combination with a reciprocatory weighing-bucket having a discharge-outlet; of a closer for said outlet, connected to the bucket and consisting of a frame and an endless belt.

18. The combination with a reciprocatory weighing-bucket having a discharge-outlet; of a closer for said outlet, connected to the bucket and consisting of a frame and an endless carrier; stream-supply means embodying a valve; and reciprocally-effective stops operative, respectively, with said valve and closer.

19. The combination with a reciprocatory weighing-bucket, of a frame carrying a pair of rolls, the shaft of one of which is supported by brackets on the bucket; and an endless belt passed around said rolls.

20. The combination with a reciprocatory weighing-bucket having a discharge-outlet; of a closer for said outlet, connected to the bucket and consisting of a frame and an endless carrier; a lever mounted on the bucket and operatively connected to the closer; and a latch for engaging said lever.

21. The combination with a reciprocatory weighing-bucket having a discharge-outlet; of a closer for said outlet, connected to the bucket and consisting of a frame and an endless carrier; closer-holding means comprehending a latch; means for supplying the bucket with a stream of material; and a valve having a tripper for said latch.

22. The combination with a reciprocatory weighing-bucket having a discharge-outlet; of a closer for said outlet, connected to the bucket and consisting of a frame and an endless carrier; and a scraper for said carrier.

23. The combination with a bucket having a discharge-outlet; of a closer for said outlet, connected to the bucket and consisting of a frame and an endless carrier; driving mechanism for said carrier; and a rotary scraper for said carrier, operated by means connected to the carrier-driving mechanism.

24. The combination with a bucket having a discharge-outlet; of a closer for said outlet, hinged to the bucket and consisting of a frame and an endless carrier; driving mechanism for said carrier; a rotating brush contiguous to the lower run of the carrier on the opening of the closer; and means for rotating said brush.

25. The combination with a bucket having a discharge-outlet; of a closer for said outlet, connected to the bucket and consisting of a frame and an endless carrier; driving mechanism for said carrier, embodying a shaft having fast and loose pulleys; a belt shiftable from one of said pulleys to the other, and vice versa; and belt-shipping means.

26. The combination with weighing mechanism embodying a bucket having a discharge-outlet; of a closer for said outlet, connected to the bucket and consisting of a frame and an endless carrier and also including a shaft carrying fast and loose pulleys; a belt shiftable from one of said pulleys to the other, and vice versa; a power-shaft carrying a pulley around which said belt is passed; and belt-shipping means controlled by the weighing mechanism.

27. The combination with weighing mechanism embodying a bucket having a discharge-outlet; of a closer for said outlet, connected to the bucket and consisting of a frame and an endless carrier; a feeder and its driving mechanism including a shaft carrying a pair of loose power-transmitting members; and means for successively coupling said power-transmitting members to the shaft.

28. The combination with weighing mechanism embodying a bucket having a discharge-outlet; of a closer for said outlet, connected to the bucket and consisting of a frame and an endless carrier and also including a shaft carrying fast and loose pulleys; a belt shiftable from one of said pulleys to the other, and vice versa; a power-shaft provided with a pulley around which said belt is passed; a reciprocatory belt-shipping bar having belt-engaging means; and means controlled by the weighing mechanism, for reciprocating said bar.

29. The combination with a bucket having a discharge-outlet; of a closer for said outlet, connected to the bucket and consisting of a frame and an endless carrier and also including a shaft carrying fast and loose pulleys; a belt shiftable from one of said pulleys to the other, and vice versa; a power-shaft provided with a pulley around which said belt is passed; a belt-shipping bar having belt-engaging means; a reciprocatory thrust-rod operatively connected to said belt-shipping bar; and means for operating said thrust-rod.

30. The combination with a bucket having a discharge-outlet; of a closer for said outlet, connected to the bucket and consisting of a frame and an endless carrier and also including a shaft carrying fast and loose pulleys; a belt shiftable from one of said pulleys to the other, and vice versa; a power-shaft provided with a pulley around which said belt is passed; a belt-shipping bar having belt-engaging means; a reciprocatory thrust-rod operatively connected to said belt-shipping bar; and a lever operatively connected to and for operating said reciprocatory thrust-rod.

31. The combination with a bucket having a discharge-outlet; of a closer connected to the bucket, for opening and closing movements and consisting of a frame and an endless conveyer.

32. The combination with a bucket having a discharge-outlet; of a closer for the outlet, hinged to the bucket and consisting of a frame and an endless carrier; driving mechanism for said carrier; stream-supply means for the bucket; and instrumentalities for simultaneously stopping the supply to the bucket and starting the carrier in motion.

33. The combination with a load-receiver having a discharge-outlet, of a movable closer connected to said receiver and normally closing said outlet; means for opening and closing said closer; and means for imparting a traveling movement thereto when said closer is in its open position, whereby the material is delivered from the load-receiver.

FRANCIS H. RICHARDS.

Witnesses:
FRED. J. DOLE,
F. N. CHASE.